United States Patent [19]
Varvel

[11] Patent Number: 5,140,495
[45] Date of Patent: Aug. 18, 1992

[54] APPARATUS AND METHOD FOR PREVENTION OF POOLING IN CARPETS AND THE LIKE

[76] Inventor: Joseph H. Varvel, 2425 W. Seldon La., Phoenix, Ariz. 85021

[21] Appl. No.: 424,684

[22] Filed: Oct. 20, 1989

Related U.S. Application Data

[63] Continuation-in-part of Ser. No. 361,332, Jun. 5, 1989, abandoned.

[51] Int. Cl.$^5$ ............................................. H05F 3/02
[52] U.S. Cl. ................................... 361/220; 361/212
[58] Field of Search ............... 361/212, 215, 216, 220; 174/51; 139/1 R; 428/85

[56] References Cited

U.S. PATENT DOCUMENTS

| | | | |
|---|---|---|---|
| 4,472,756 | 9/1984 | Masuda | 361/212 |
| 4,528,612 | 7/1985 | Spengler | 361/213 |
| 4,864,459 | 9/1989 | Larigaldie et al. | 361/216 |

Primary Examiner—A. D. Pellinen
Assistant Examiner—David Osborn
Attorney, Agent, or Firm—William W. Holloway

[57] ABSTRACT

An electrostatic discharge collection device for mounting in an air delivery duct system leading into a carpeted area for neutralizing an electrostatic charge in the air prior to its entering into the carpeted area so as to prevent or reduce a problem known as pooling in the carpet.

6 Claims, 1 Drawing Sheet

APPARATUS AND METHOD FOR PREVENTION OF POOLING IN CARPETS AND THE LIKE

This is a continuation-in-part of copending application Ser. No. 07/361,332 filed on Jun. 5, 1989, abandoned.

BACKGROUND OF THE INVENTION

1. Field of the Invention

This invention relates generally to electrostatic discharge devices and, more particularly, to a device for neutralizing an electrostatic charge in an air stream to prevent charged ions from entering into a carpeted room or other area, and reacting with the carpet, the reaction of charged ions causing unsightly areas or lines in the carpeting typically referred to as pooling.

2. Description of the Related Art

For many years, a problem commonly referred to as pooling has existed in the carpet industry. The pooling problem can occur in virtually any installed carpet at any time and produces the visual appearance of a water mark, or unnatural shading of random regions of the carpet. Whenever pooling occurs, the unsightly marks produced thereby have caused disputes as to the origin thereof between carpeting manufacturers, installers and purchasers to the extent that, in many instances, large quantities of otherwise excellent carpeting have been replaced. Even so, when such carpeting has been replaced, there is no guarantee that pooling will not reoccur. In fact, it is commonly known that the condition will re-occur.

To the best of my knowledge, no one has heretofor discovered the origin of pooling and, therefore, no suggestion of a cure or means for preventing the occurrence of the problem has been made.

SUMMARY OF THE INVENTION

In accordance with the present invention, a new and useful electrostatic discharge device is disclosed for preventing pooling in installed carpeting. Pooling is apparently caused by an electric field which results from an accumulation of positive ions on particular areas of the carpet surface.

A major source of ions are air delivery systems which supply heated air, chilled air, or ventilating air into the room or other area where the carpeting is installed. A theory proposes that air turbulence and agitation produces the charged ions, and this turbulence and agitation results from blower operation in the air handling equipment and by movement of the air along duct work and through air distribution grills or registers.

Accordingly, the device of the present invention includes electrostatic discharge means which is mounted in the air stream of an air delivery system and is coupled to a ground potential so as to neutralize the ions produced by the agitated and otherwise turbulent air prior to such ions entering the carpeted area. It has been found that, in the absence of other sources of agitated and turbulent air, the grounded electrostatic discharge means will prevent pooling in an installed carpet. In some instances, the electrostatic discharge means will allow an installed carpet having a pooling problem to return to normal without any additional treatment. However, in many instances, the pile of the carpeting may need to be reset, such as by steaming thereof, to return the carpet to an original condition so that the electrostatic discharge means can prevent reoccurrence of the problem.

In a first embodiment of the present invention, the electrostatic discharge means includes a frame of electrically conductive material, such as metal, which is configured to substantially match the internal cross sectional configuration of an air delivery duct in which it is to be installed. A plurality of electrode element means, such as rods, bars, or the like, are mounted in the conductive frame in spaced apart relationship with respect to each other. The electrode element means, which may be formed of carbon, nickel, or any other material which is suitable for use as an electrode, are mounted tightly in the frame to insure a good electrically conductive contact between the electrode elements and the frame and to prevent rattling of the electrode elements.

The electrostatic discharge means of this first embodiment is mounted within the air delivery duct preferably proximate the outlet end thereof so that the air moving through the duct will pass through the electrostatic discharge means just prior to its emerging from the air delivery duct. In the case where the air delivery duct is fabricated of metal, the frame of the electrostatic discharge means may be electrically coupled to the duct such as by suitable metal fasteners, or such as screws which also serve to mount the electrostatic discharge means in place within the duct. In this case, the metal duct may be grounded, such as by connecting a suitable ground wire to any convenient location on the duct. In the case of non-conductive ducting, such as those fabricated of a thermally insulative fiber board, the ground wire must be coupled directly to the frame of the electrostatic discharge means, such as by being connected to one of the fasteners which mount the electrostatic discharge means in the non-conductive ducting.

In a second embodiment, the electrostatic discharge means is associated with the air distribution grill, or register, which is customarily mounted at the outlet end of the air delivery duct. Most air distributing grills include a face plate and a sleeve-like frame which extends rearwardly from the face plate into the outlet end of the air delivery duct. In less expensive grills, the face plate has fixed louvers stamped or otherwise formed therein. In this case, a plurality of electrode elements means may be mounted in the sleeve-like frame of the grill immediately behind the fixed louvers of the face plate. In more expensive grills, the louvers are pivotably mounted in the sleeve-like frame at the otherwise open junction of the face plate and the sleeve-like frame. In these more expensive grills, the plurality of electrode element means may be mounted in the sleeve-like frame in the manner described above, or the pivotable mounted louvers may be fabricated of a suitable electrode material so as to accomplish the electrostatic discharging function in addition to their usual air distribution function.

Yet another technique for providing for electrostatic discharge includes the mounting of a single electrode, the electrode being attached directly to the metal of the duct work by means of metal clips. Screws are typically used as the means of attachment although other methods for securing the electrode to the duct work can be used.

Accordingly, it is an object of the present invention to provide a new and useful means for preventing pooling in installed carpeting.

Another object of the present invention is to provide a new and useful electrostatic discharge means for mounting in the air stream of an air delivery system to neutralize an electrostatic charge in the air prior to its entering into a carpeted area, and thereby preventing pooling of the carpet.

Another object of the present invention is to provide a new and useful electrostatic discharge means of the above described character which is configured for mounting in an air delivery duct preferably proximate the outlet end thereof so that the agitated and otherwise turbulent air moving through the duct will pass through the electrostatic discharge means just prior to its emerging from the air delivery duct.

Another object of the present invention is to provide a new and useful electrostatic discharge means of the above described type wherein the electrostatic discharge means includes a suitable electrically conductive frame having a plurality of electrode element means mounted in spaced apart relationship therein, with the electrode element means being in electrically conductive contact with the frame which is in turn connected to a positive ground.

The foregoing and other objects of the present invention, as well as the invention itself, may be more fully understood from the following description when read in conjunction with the accompanying drawings.

DESCRIPTION OF THE PREFERRED EMBODIMENT

Figure 1:
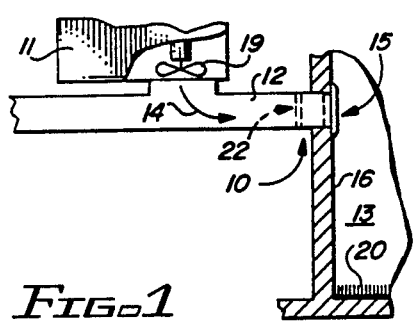
FIG. 1 is a diagrammatic view showing the installation of the electrostatic discharge means of the present invention in a typical air delivery duct between an air handling mechanism and a carpeted area.

Referring more particularly to the drawings, FIG. 1 shows a typical air delivery duct system which is illustrated in diagrammatic form and is indicated generally by the reference numeral 10. Such systems are commonly used to deliver air from an air handling device 11, such as a heater, refrigeration unit, or the like, through a tubular duct 12 into an area, such as a room 13 which is to be heated, cooled, or simply ventilated. The air moves through the tubular duct 12 in the direction of the arrow 14 to an air distribution grill 15 which is provided at the air outlet end of the air delivery duct system 10. As seen best in FIG. 1A, a typical air distribution grill 15 is mounted on a wall 16, or in some instances in the floor or ceiling (not shown), of the area 13, and includes a suitable frame 17 having a plurality of louvers 18 mounted therein for air directing and velocity control purposes as is well known in the art.

The air which is caused to move through the air delivery duct system 10 will be in an agitated and otherwise turbulent state due to the air moving device 19, such as the illustrated fan, or centrifugal blower (not shown), that is associated with the air handling device 11 and due to movement of the air through the tubular duct 12. It is believed that the inducement of the agitated and otherwise turbulent state of the air produces charged ions in the air which move along with the air into the area 13. Upon entering the area, the ions, according to one theory, tend to collect in installed carpeting 20 in the area 13. It is further believed that the presence on the carpet surface of positively charged ions results in the problem commonly referred to as "pooling" in the carpet industry. Whenever installed carpeting is effected by "pooling" it will be in the form of what may be visually compared to a water mark, or unnatural discoloration, along a randomly extending line or lines and areas in the carpeting. Upon close examination of the carpeting, the appearance of a water mark, or unnatural discoloration, is produced by the pile of the carpeting laying in opposing or different directions on opposite sides of the random line or lines.

Figure 2:
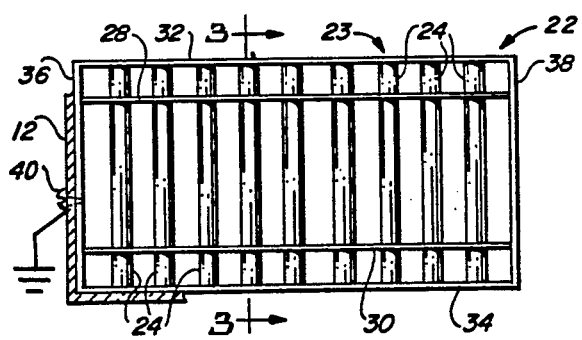
FIG. 2 is a front elevational view on an enlarged scale of the electrostatic discharge means shown in FIG. 1.
Figure 1A:
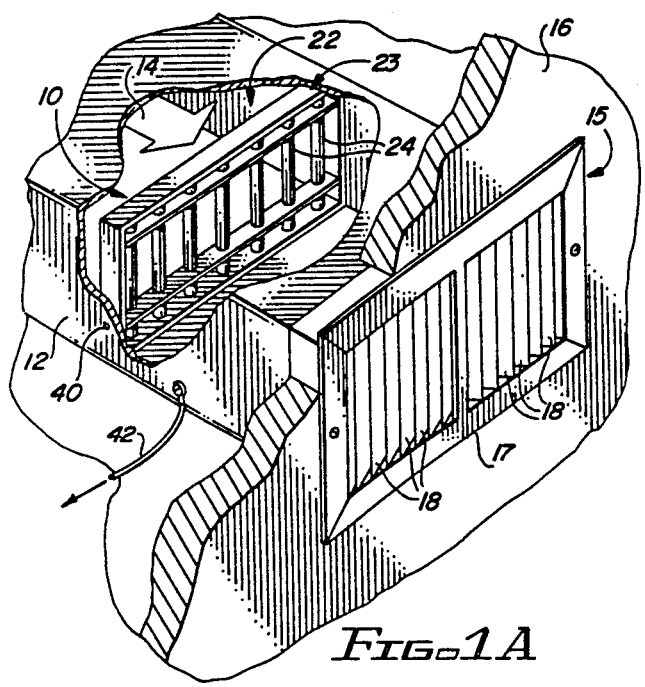
FIG. 1A is a fragmentary perspective view of the outlet end of the air delivery duct which is partially broken away to show the installation of the first embodiment of the electrostatic discharge means of the present invention.

Therefore, in accordance with the present invention, an electrostatic discharge means is disclosed for installation in the air stream of the duct system 10, with the preferred embodiment being indicated generally by the reference numeral 22 in FIGS. 1, 1A, and 2 of the drawings. The electrostatic discharge means 22 includes a frame means 23 formed of electrically conductive material such as metal and configured so as to substantially conform to the internal cross-sectional configuration of the tubular duct 12. It is to be understood, that tubular ducts of various sizes and shapes are in common use by the air conditioning industry, and as a result, the frame means 23 will need to be formed in various sizes and shapes. Therefore, the illustrated rectangular configuration of the frame means 23 is not to be construed as a limitation of the present invention.

The electrostatic discharge means 22 further includes a plurality of electrode element means 24 which are mounted in spaced apart relationship with respect to each other in the conductive frame means 23. The number of electrode element means 24 is determined first by the physical size of the tubular duct 12 and the need for not producing an excessive resistance, or back pressure, to the movement of air through the duct system 10.

The electrode element means 24 may be of any suitable configuration with the illustrated cylindrical rods being preferred due to such rods producing a minimal amount of turbulence to air movement, as compared to square in cross section rods for example. The electrode element means 24 could, of course, be of other configurations such as fins, louvers, and the like. In any case, the electrode element means 24 are formed of carbon, nickel or other material suitable for use as an electrode.

Figure 3:
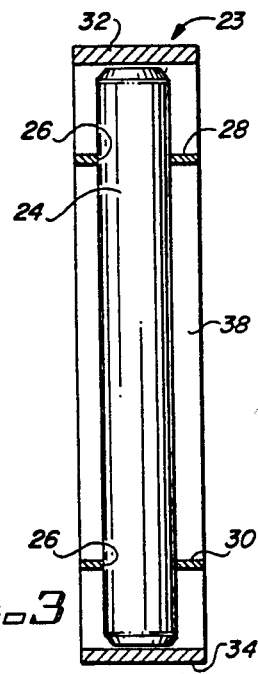
FIG. 3 is an enlarged sectional view taken along the line 3—3 of FIG. 2.

Each of the electrode element means 24 is mounted in the conductive frame means 23 so as to be in electrically conductive contact therewith. In the illustrated embodiment, the cylindrical electrode element means 24 have their opposite ends extending through suitable openings 26 provided in spaced increments along the lengths of a pair of mounting plates 28 and 30. The plates 28 and 30 are disposed proximate the top frame member 32 and the bottom frame member 34, respectively, of the frame means 23 and extend transversely between the opposed side frame elements 36 and 38 of the frame. As shown in FIG. 3, each of the cylindrical electrode element means 24 is a tight fit in the aligned apertures 26 of the mounting plates 28 and 30. The plates 28 and 30 are formed of an electrically conductive material, such as metal, and are welded or otherwise mounted in the frame means 23.

Therefore, the electrode element means 24 are in electrically conductive contact with the mounting plates 28 and 30 which are, in turn, in electrically conductive contact with the frame means 23.

As seen best in FIG. 1, the above described electrostatic discharge means 22 is mounted within the tubular duct 12 of the duct system 10 so that the frame means 23 is in bearing engagement, at least to some extent, with the inner surfaces of the tubular duct. The electrostatic discharge means 22 is fixed in place within the tubular duct 12 by means of suitable fasteners 40, such as sheet metal screws. In addition to fixing the electrostatic discharge means 22 in the tubular duct 12 to prevent displacement, or rattling, thereof as a result of air movement, the fastener means 40, which is shown as being coupled to ground potential in FIG. 2, provides a positive coupling for establishing an electrically conductive contact between the electrostatic discharge means and the duct system 10.

According to yet another embodiment, the electrostatic discharge means 22 can be implemented by a single electrode coupled across the tubular duct 12 to neutralize the charged ions.

It has been found that proper operation of the electrostatic discharge means 22 is only insured when the duct system 10 is coupled to a ground. In the case of metal ducts, that ground can be established by connecting a suitable ground wire 42 to any convenient location on the duct system 10 as indicated in FIG. 1. In the case of non-metallic ducts, such as those fabricated of thermally insulative fiberboard (not shown) which are in common use in the air conditioning industry, it will be necessary to attach the ground wire to the fastener means (i.e., 40) or directly to the electrostatic discharge means 22.

Figure 4:
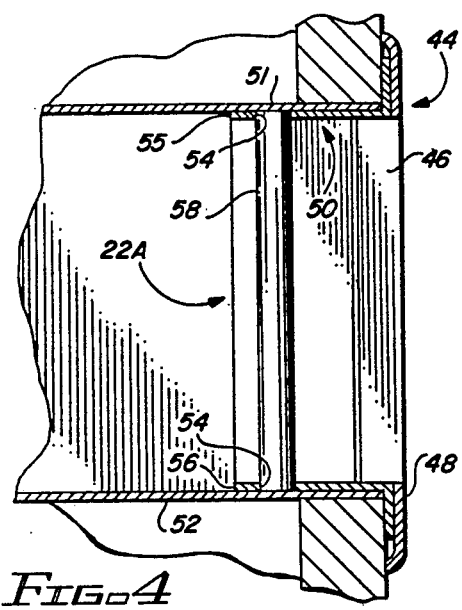
FIG. 4 is a sectional view taken on a vertical plane through an air distribution grill which is configured to include the second embodiment of the electrostatic discharge means of this invention.

Reference is now made to FIG. 4 which is a sectional view taken on a vertical plane through a grill 44, or register, of the type mentioned above as being mounted on the air outlet end of an air delivery duct system 10. The grill 44 is intended to show a relatively inexpensive type of grill which is in common use, with the grill having air directing louvers 46 stamped or otherwise formed in the face plate 48 thereof. This type of fixed louver grill 44 is usually provided with a sleeve-like frame 50 that extends rearwardly from the face plate 48 into the air outlet end 51 of the tubular duct 52. In accordance with the second embodiment of the present invention, the electrostatic discharge means 22A is formed as part of the grill 44. The sleeve-like frame 50 of the grill is modified to include a plurality of apertures 54 (two shown) formed in spaced increments in opposed flanges 55 and 56 thereof, and a plurality of electrode element means 58 (one shown) are positioned in the sleeve-like frame 50 in a manner similar to that hereinbefore fully described. The electrode element means 58 may be similar to the previously described cylindrical electrode element means 24 or of any other suitable configuration.

Figure 5:
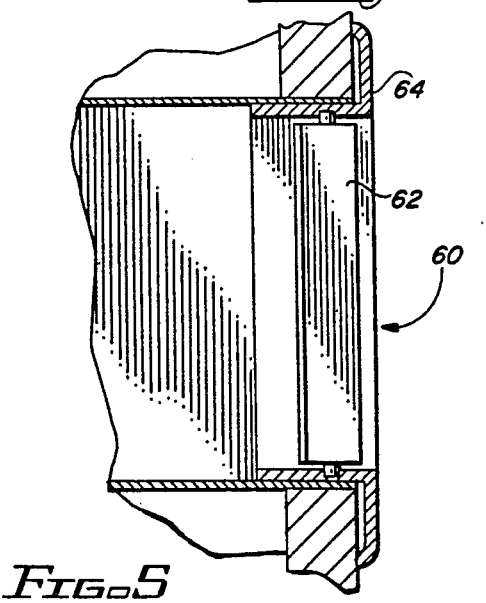
FIG. 5 is a sectional view similar to FIG. 4 showing another type of air distribution grill with a third embodiment of the present invention.

A third embodiment of the present invention is shown in FIG. 5 wherein an adjustable louver type of grill and the electrostatic discharge device are formed as a single structure which is identified generally by the reference numeral 60. The combination structure 60 is similar to a commonly used grill wherein a plurality of louvers 62 (one shown) are movably mounted in the grill frame 64. In order to accomplish the desired electrostatic discharge function, the adjustably movable louvers commonly used in such grills are replaced with the special louvers 62 that are formed of a suitable electrode material such as of the types mentioned above.

The operation of the various embodiments of electrostatic discharge means operate in accordance with the well known principles of electrostatics so as to neutralize the electrostatic charge of the air that is being supplied to the carpeted area 13 and thereby eliminate that source of the pooling problem in the carpet 20.

With respect to the related art involving electrostatic conditioning of an air stream, British Patent 533,139, entitled "A Device for the Control of the Diffusion of Air from an Air Conditioning or Ventilating Machine or parts thereof", and invented by Harold John Sharp, describes the use of louvres for an outlet vent to control the direction and amount of air issuing from a duct. The application to pooling of carpets and rugs is not discussed. U.S. Pat. No. 3,593,645, entitled "Terminal Outlet for Air Distribution System", and invented by Thomas L. Day and Michael L. Krisko, describes apparatus for controlling the discharge of air into a room. The reference does not describe or suggest any technique or apparatus related to the pooling of carpets. U.S. Pat. No. 3,599,399, entitled "Apparatus for Filtering Pollutants", and invented by Thomas J. Gallen, describes a method for filtering particles, particularly paint particles from an air stream. The apparatus charges the particles in order that electrodes of the opposite charge can be used to attract the particles and remove them from the air stream. However, the reference does not describe the neutralization of a charged air stream and does not address the problem of pooling of carpets.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles. The appended claims are therefore intended to cover and embrace any such modifications within the limits only of the true spirit and scope of the invention.

What is claimed is:

1. A method of minimizing the pooling of carpets in a carpeted area, wherein an air flow is directed into said carpeted area, the method comprising the steps of:
   neutralizing an ionic content of said air flow entering said carpeted area.

2. The method of claim 1 wherein said neutralizing step includes a step of positioning an electrode structure having a preselected potential in said air flow.

3. The method of claim 1 wherein said air flow is directed into said carpeted area through an air delivery duct, said neutralizing step including the steps of:
   mounting an electrode means in said air delivery duct; and
   coupling said electrode means to ground potential.

4. The method of claim 3 further comprising the step of:

implementing said electrode means with a plurality of spaced electrodes, said spaced electrodes being coupled to said ground potential.

5. The method of claim 3 further comprising the step of implementing said electrode means with a grill means mounted on an outlet of said air delivery duct.

6. The method of claim 3 wherein said air delivery duct has a frame means defining an air flow passage and fabricated from an electrically conducting material mounted within said frame means, said method further comprising the steps of:

mounting said electrode means in said air flow passage; and electrically coupling said electrode means to said frame means.

* * * * *